United States Patent [19]

Brammer et al.

[11] Patent Number: 5,844,135
[45] Date of Patent: Dec. 1, 1998

[54] TEMPERATURE SENSOR FOR MEASURING A FLOW MEDIUM IN A FLOW CONDUIT OF AN INTERNAL COMBUSTION ENGINE

[75] Inventors: Hartmut Brammer, Vaihingen; Joachim Kuhrau, Burgberg; Otto Schuster, Waltenhofen; Walter Schieferle, Sonthofen; Anita Rose, Hemmingen; Bernd Kuenzl, Schwieberdingen; Hermann Bundschuh, Oberstaufen; Herbert Biederwolf, Isny, all of Germany

[73] Assignee: Robert Bosch GmbH, Stuttgart, Germany

[21] Appl. No.: 716,904

[22] Filed: Sep. 20, 1996

[30] Foreign Application Priority Data

Sep. 20, 1995 [DE] Germany ............ 195 34 890.7

[51] Int. Cl.$^6$ ........................................ G01F 1/68
[52] U.S. Cl. .................. 73/202.5; 73/118.2; 73/204.19; 73/204.22; 73/204.23; 73/204.25
[58] Field of Search ................ 73/118.2, 202.5, 73/204.19, 204.22, 204.23, 204.25

[56] References Cited

U.S. PATENT DOCUMENTS

| | | | |
|---|---|---|---|
| 2,728,225 | 12/1955 | Skibitzke | 73/204.22 |
| 2,986,925 | 6/1961 | Gentry, Jr. et al. | 73/204.19 |
| 3,595,079 | 7/1971 | Grahn | 73/204.22 |
| 4,016,758 | 4/1977 | Taylor | 73/204.22 |
| 4,135,396 | 1/1979 | Stanke et al. | 73/204.19 |
| 4,142,170 | 2/1979 | Blatter | 73/204.25 |
| 4,311,047 | 1/1982 | Hubbard, Jr. et al. | 73/204.19 |
| 4,856,329 | 8/1989 | Buck et al. | 73/204.22 |
| 4,932,256 | 6/1990 | Buck et al. | 73/204.22 |
| 5,261,272 | 11/1993 | Rush, II et al. | 73/118.2 |
| 5,415,029 | 5/1995 | Uchiyama et al. | 73/202.5 |

FOREIGN PATENT DOCUMENTS

8218081 U  10/1983  Germany .

*Primary Examiner*—Richard Chilcot
*Assistant Examiner*—Eric S. McCall
*Attorney, Agent, or Firm*—Edwin E. Greigg; Ronald E. Greigg

[57] ABSTRACT

A temperature sensor for measuring and/or monitoring the temperature of a medium flowing in a flow conduit of an internal combustion engine. The sensor has a one-piece plastic body with a sensor and plug part, a resistor element, connecting plug tongues, and a housing that receives the sensor part. In order to reduce production and installation costs and to attain other advantages as well, the housing is of temperature-resistant plastic that absorbs little moisture, sprayed directly onto the sensor part. For sealingly and securing the housing in a receiving bore in the wall of the flow conduit, a radially protruding annular bead is injection molded to the housing, and a sealing ring is plastic between the plug part and the annular bead.

16 Claims, 1 Drawing Sheet

TEMPERATURE SENSOR FOR MEASURING A FLOW MEDIUM IN A FLOW CONDUIT OF AN INTERNAL COMBUSTION ENGINE

BACKGROUND OF THE INVENTION

The invention is based on a temperature sensor for measuring and/or monitoring the temperature of a medium flowing in a flow conduit of an internal combustion engine, especially coolants, fuel or oil, of the type normally used.

In a known temperature sensor of this type (German Utility Model DE 82 18 081 U1), the housing is made of metal, preferably brass, and has a male thread for insertion into a corresponding female thread that is cut into the receiving bore present in the wall of the flow conduit.

OBJECT AND SUMMARY OF THE INVENTION

The temperature sensor according to the invention has the advantage of being entirely of plastic—except for the electrical parts—and hence can be made very inexpensively. By the selection of certain thermal plastics for the housing, swelling or expansion of the plastic housing is virtually entirely averted. Since the temperature sensor—except for the electrical parts —comprises only a single material, it can be recycled economically.

Advantageous further features of and improvements to the temperature sensor are possible with the provisions recited hereinafter.

In an advantageous embodiment of the invention, the means for sealing and securing the device in the receiving bore of a housing have an annular bead, which radially protrudes from the outside of the housing and is integrally injection molded onto the housing, and a sealing ring, which is seated on the housing and is held axially indisplaceably between the plug part and the annular bead. Because it is then possible to plug the temperature sensor into the receiving bore, instead of screwing it in as before, installation is made simpler and can be done quickly and without extra tools. The costly brass housing, with the male thread that has to be cut open, is dispensed with. As a result, and because of the omission of the otherwise necessary female thread in the receiving bore, still another advantage in terms of production is attained.

In a preferred embodiment of the invention, the annular bead tapers with increasing radial spacing from the housing, and its outer diameter of the annular bead is dimensioned to be slightly larger than the inside diameter of the receiving bore in the wall of the flow conduit.

In an advantageous embodiment of the invention, the annular bead may be subdivided into equal intervals, forming a ring of beadlike protrusions or serrations that are arranged equidistantly from one another. Such protrusions or serrations can be pressed into the receiving bore with little expenditure of force, because they deform more easily. Plugging the temperature sensor in thus becomes easier and installation involves less expenditure of force, without jeopardizing the firm seating of the temperature sensor in the receiving bore.

In an advantageous embodiment of the invention, radially protruding locking faces are embodied on the plug part, which are clasped by the legs of a clasplike hoop that can be fixed on the engine block. As a result of this securing clip, the temperature sensor is plugged into the receiving bore and secured against axial displacement, so that even under rough operating conditions of the engine it cannot loosen unintentionally in the receiving bore and fall out.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
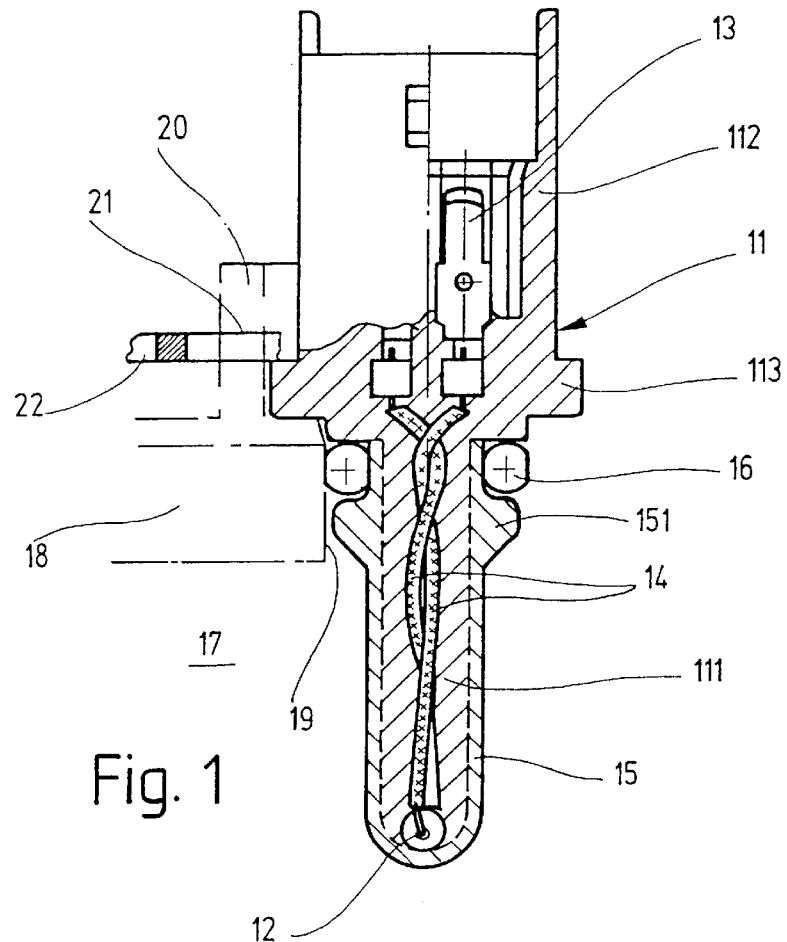
FIG. 1 is a side view, partly in section, of a temperature sensor.

The temperature sensor shown partly in longitudinal section in FIG. 1 serves to measure and/or monitor the temperature of a medium flowing in a flow conduit of an internal combustion engine. Such a medium may for instance be the coolant or the lubricating oil in an engine, or the fuel for the engine. The temperature sensor has a plastic body 11 on which a fingerlike sensor part 111 and an adjoining plug part 112, whose outer diameter is larger than the diameter of the sensor part 111, are integrally formed. A resistor element, in this instance an NTC resistor 12, is disposed in the end of the sensor part 111 remote from the plug part. Two electrical terminals, here embodied as plug tongues 13, are received in the plug part 112; they are accessible from the face end of the plug part 112 and are connected to the NTC resistor 12 via two electrical lines 14 embedded in the sensor part 111. The plastic body 11 with the molded-on sensor part 111 and plug part 112 is injection-molded, and the NTC resistor 12, the plug tongues 13 and the electrical lines 14 are fixed in the plastic body 11.

The sensor part 111 is surrounded by a housing 15 of temperature-resistant plastic that absorbs little or no moisture and is directly injected molded onto the sensor part 111. Thermoplastics with little water absorption are suitable for this purpose, such as polyphenylene sulfide with glass fiber or polyphthalamide with glass fiber. A radially protruding annular bead 151 is injection-molded onto the housing 15 at the predetermined spacing from the plug part 112. The spacing from the plug part 112 is chosen such that an O-ring 16 can be placed between the underside of the plug part 112 and the radial bead side oriented toward it. The diameter of the O-ring 16 is selected such that its outer circumference protrudes only slightly beyond the outer diameter of the annular bead 151, so that when the sensor part 111 is passed through a receiving bore in the wall of a flow conduit, the O-ring can press firmly, with elastic deformation, against the inner wall of the receiving bore. FIG. 1 in dot-dashed lines shows the wall of a flow conduit with a receiving bore. The flow conduit is marked 17, the wall is marked 18, and the receiving bore piercing the wall for the sensor part 111 is marked 19.

Figure 2:
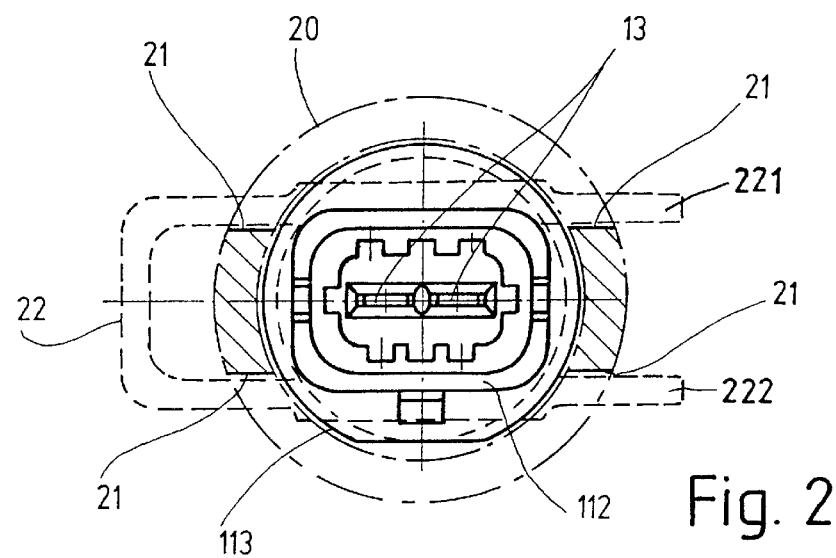
FIG. 2 is a plan view of the temperature sensor of FIG. 1.

An annular flange 113 is formed out of the plug part 112 for fixation of the temperature sensor plugged into the receiving bore 19; with its lower annular face oriented toward the sensor part 111, this flange forms a stop, while with its upper annular face oriented toward the plug part 112, it forms a locking face. As can be seen in FIG. 1 and FIG. 2, an annular support 20 is formed coaxially with the receiving bore 19 on the wall 18 of the flow conduit 17; its inside diameter is slightly larger than the outside diameter of the annular flange 113. Provided in the support 20 are four insertion openings 21, extending crosswise to the support axis, for the insertion therethrough of a clasplike U-shaped clip 22; each two insertion openings 21 are aligned with one another and serve to allow the passage through them of a respective leg 221 and 222 of the clip 22. The disposition of insertion opening 21 and the axial thickness of the annular flange 113 are arranged such that after the insertion of the temperature sensor into the receiving bore 19 and until the lower side of the annular flange strikes the wall 18 of the flow conduit 17, the legs 221, 222 of the clip that have been passed through the insertion openings 21 rest on the top side toward the plug, that is, the side forming the locking face, of the annular flange 113, and they thus secure the annular flange 113 against axial displacement.

In a modification of the temperature sensor described, the annular bead 151, which tapers with increasing radial spacing from the housing 15, may have a diameter that is slightly larger than the inside diameter of the receiving bore 19. These provisions not only assure firm seating of the sensor part 111 in the receiving bore 19 but at the same time accomplish an additional sealing action in addition to the O-ring 16, by means of the annular bead 151. To make the temperature sensor easier to plug into the receiving bore 19 when there is this kind of modified annular bead 151, the annular bead 151 can be modified by notches to form a ring of beadlike equidistant protrusions or serrations. Such serrations or protrusions are more easily deformable elastically, making it substantially easier to insert the sensor part 111.

The foregoing relates to preferred exemplary embodiments of the invention, it being understood that other variants and embodiments thereof are possible within the spirit and scope of the invention, the latter being defined by the appended claims.

What is claimed and desired to be secured By Letters Patent of the United States is:

1. A temperature sensor for measuring and/or monitoring the temperature of a medium flowing in a flow conduit (17) of an internal combustion engine, comprising a one-piece plastic body (11) that has a sensor part (111) and a plug part (112), on an end remote from the plug part, a NTC resistor element is disposed, and whose plug part (112) has two externally accessible electrical terminals (13), which are connected to the resistor element (12) via two electrical lines embedded in the sensor part (111), and having a housing (15) that completely surrounds the sensor part (111) and has means for sealing and securing the plastic body in a receiving bore (19) in the wall (18) of the flow conduit (17), the housing (15), of temperature-resistant plastic that absorbs little or no moisture, is applied directly onto the sensor part (111) to completely surround the sensor part (111).

2. A temperature sensor in accordance with claim 1, in which the plastic of the housing (15) is injection molded with the sensor part (111).

3. A temperature sensor in accordance with claim 1, in which the means for sealing and securing said sensor in the receiving bore (19) have an annular bead (151) that radially protrudes from the outside of the housing (15) and is integrally injection molded onto the housing (15) to form one part and a sealing ring (16) is seated on the housing (15) and axially indisplaceably held between the plug part (112) and the annular bead (151).

4. A temperature sensor in accordance with claim 2, in which the means for sealing and securing said sensor in the receiving bore (19) have an annular bead (151) that radially protrudes from the outside of the housing (15) and is integrally injection molded onto the housing (15) to form one part and a sealing ring (16) is seated on the housing (15) and axially indisplaceably held between the plug part (112) and the annular bead (151).

5. A temperature sensor in accordance with claim 3, in which the annular bead (151) tapers with increasing radial spacing from the housing (15), and that the outer diameter of the annular bead (151) is dimensioned to be slightly larger than the inside diameter of the receiving bore (19) in the wall (18) of the flow conduit (17).

6. A temperature sensor in accordance with claim 4, in which the annular bead (151) tapers with increasing radial spacing from the housing (15), and that the outer diameter of the annular bead (151) is dimensioned to be slightly larger than the inside diameter of the receiving bore (19) in the wall (18) of the flow conduit (17).

7. The temperature sensor in accordance with claim 1, in which radially protruding locking faces are embodied on the plug part (112), which are clasped by securing legs (221, 222) of a clasplike hoop (22) that is fixed in the wall (18) of the flow conduit (17).

8. The temperature sensor in accordance with claim 2, in which radially protruding locking faces are embodied on the plug part (112), which are clasped by securing legs (221, 222) of a clasplike hoop (22) that is fixed in the wall (18) of the flow conduit (17).

9. The temperature sensor in accordance with claim 3, in which radially protruding locking faces are embodied on the plug part (112), which are clasped by securing legs (221, 222) of a clasplike hoop (22) that is fixed in the wall (18) of the flow conduit (17).

10. The temperature sensor in accordance with claim 4, in which radially protruding locking faces are embodied on the plug part (112), which are clasped by securing legs (221, 222) of a clasplike hoop (22) that is fixed in the wall (18) of the flow conduit (17).

11. The temperature sensor in accordance with claim 5, in which radially protruding locking faces are embodied on the plug part (112), which are clasped by securing legs (221, 222) of a clasplike hoop (22) that is fixed in the wall (18) of the flow conduit (17).

12. The temperature sensor in accordance with claim 1, in which the housing is made of thermal plastics with little or no water absorption, selected from polyphenylene sulfide with glass fiber or polyphthalamide with glass fiber.

13. The temperature sensor in accordance with claim 2, in which the housing is made of thermal plastics with little or no water absorption, selected from polyphenylene sulfide with glass fiber or polyphthalamide with glass fiber.

14. The temperature sensor in accordance with claim 3, in which the housing is made of thermal plastics with little or no water absorption, selected from polyphenylene sulfide with glass fiber or polyphthalamide with glass fiber.

15. The temperature sensor in accordance with claim 4, in which the housing is made of thermal plastics with little or no water absorption, selected from polyphenylene sulfide with glass fiber or polyphthalamide with glass fiber.

16. The temperature sensor in accordance with claim 5, in which the housing is made of thermal plastics with little or no water absorption, selected from polyphenylene sulfide with glass fiber or polyphthalamide with glass fiber.

* * * * *